No. 769,035. PATENTED AUG. 30, 1904.
H. B. WALTER.
LOCK HINGE.
APPLICATION FILED NOV. 23, 1903.
NO MODEL.

Witnesses: Inventor:

No. 769,035.  
Patented August 30, 1904.

UNITED STATES PATENT OFFICE.

HARRISON B. WALTER, OF DANVILLE, ILLINOIS.

LOCK-HINGE.

SPECIFICATION forming part of Letters Patent No. 769,035, dated August 30, 1904.

Application filed November 23, 1903. Serial No. 182,400. (No model.)

*To all whom it may concern:*

Be it known that I, HARRISON B. WALTER, a citizen of the United States, residing at Danville, in the county of Vermilion and State of Illinois, have invented new and useful Improvements in Lock-Hinges, of which the following is a specification.

My invention relates to improvements in lock-hinges.

Said invention has for its object to provide for the automatic holding or retention of the sash, door, or blind at any desired point or angle at which it may be stood or placed in its open position as against being closed by any other than manual force, while said invention or device is characterized for its ready application, efficiency, and simplicity, consequently cheapness of manufacture.

It consists of the combination and arrangement of parts, including their construction, substantially as hereinafter disclosed by the following description and particularly pointed out by the claim.

Figure 1:
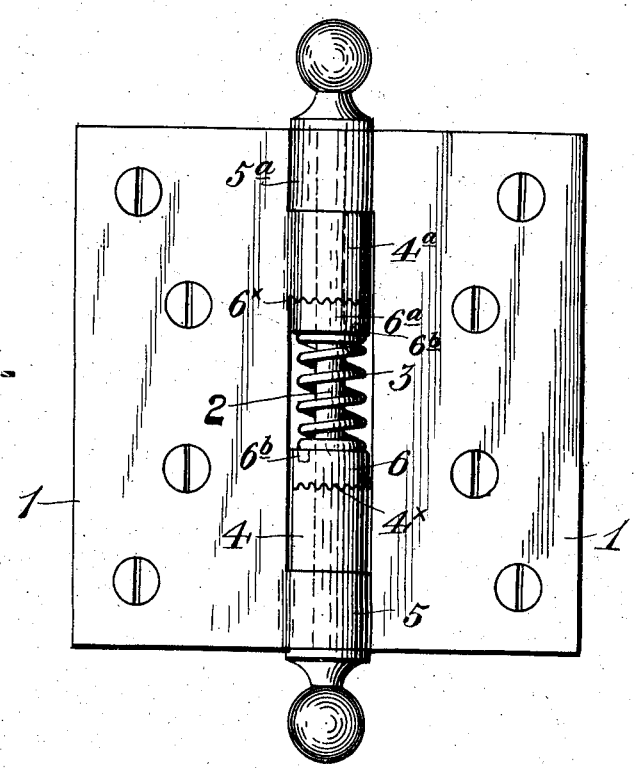
Figure 2:
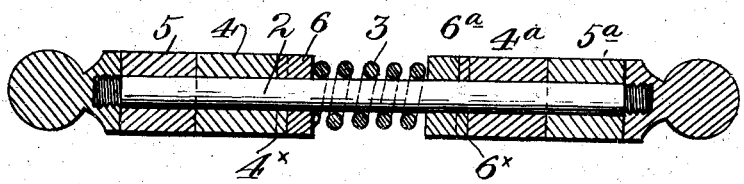

In the accompanying drawings, illustrating the preferred embodiment of my invention, Figure 1 is a view in front elevation thereof. Fig. 2 is a central longitudinal section of the same.

In the carrying out of my invention I employ two members, wings, or leaves 1, similar to the corresponding parts of a butt-hinge, each being the counterpart of the other and adapted to receive fastenings, as screws or the like, for securing the same to the parts to which they are to be applied. A pintle or pivot 2, having headed or shouldered ends, provides for connecting together said leaves or wings, as more fully presently explained. Each of said leaves or wings is provided at its articulating or inner edge with a lug or bearing 4 $4^a$, respectively, the lug $4^a$ of one leaf being arranged a short distance from its upper edge and the lug 4 being similarly arranged with relation to the bottom edge of its leaf. Said leaves or wings are also provided at the same edges with further or additional lugs or bosses 5 $5^a$, respectively, the lug or boss 5 being arranged at the bottom edge of its leaf and abutting or engaging the bottom surface of the lug 4 and the lug $5^a$ being arranged at the top edge of its leaf and abutting or engaging the upper surface of the lug $4^a$, the two series of lugs thus described thus alternating with and alining each other. All of these lugs are provided with coinciding or registering apertures or passages which receive the pintle or pivot 2, above noted, to provide for articulating or connecting together the leaves or wings of the device.

Separate lugs or bearings 6 $6^a$, adapted to engage the lugs 4 $4^a$ and to permit the passage therethrough of the pintle 2, are connected to the upper and lower ends of a spring 3, respectively, said ends of the spring being preferably straightened to form suitable terminals $6^b$ to engage sockets in said lugs or bearings. Said spring is thus interposed between the lugs 6 $6^a$ and arranged upon the pintle or pivot 2 between the inner edges of the leaves or wings 1, the last referred to being adapted to that end, the purpose of which arrangement will presently more fully appear. Said lugs 6 $6^a$, as also lugs 4 $4^a$ of the leaves or wings, are formed upon their meeting or engaging surfaces with undulations or corrugations, as at $4^\times$ $6^\times$, respectively, the object of which will be apparent later on. In effecting engagement between the lugs 6 $6^a$ and 4 $4^a$ the spring 3, with its ends connected to said lugs 6 $6^a$, is initially compressed or contracted and the first-named lugs then interposed between the latter lugs, the pintle 2 having been previously inserted through said lugs and interiorly of said spring, thus providing for applying or delivering the tension or pressure of said spring thereon, the corrugated or undulatory surfaces of said lugs aiding this contacting action. This will have the effect to produce a binding action or impingement between the lugs 4 $4^a$ and the lugs 5 $5^a$ of the leaves or wings 1 to prevent involuntary movement of the axially-movable wing or leaf, to which is connected the sash, door, or blind, consequently providing for the effective holding or retention of the last noted as against like movement at whatever angle or point in which it may be placed in its open position.

This arrangement obviates, it will be noted, the use of improvised means for the propping or holding open the sash, door, or blind—as a stick, block, or the like, as heretofore resorted to—and, further, permits of effecting such retention automatically and at just the angle it may be desired.

It will be understood that I do not limit myself to details herein, as they may be changed as circumstances suggest without departing from the spirit of my invention and the same still be protected.

Having thus described my invention, what I claim as new, and desire to secure by Letters Patent, is—

In a hinge of the character described, the combination with the leaves having the respective inner knuckles thereof serrated on their inner edges, and a pintle pivotally connecting said leaves, of perforated lugs having serrated outer edges mounted to slide on said pintle in the space between said knuckles, and a spring surrounding said pintle and interposed between said lugs whereby they are held by the tension of said spring in frictional contact with the serrated knuckles of the hinge and thereby hold the movable leaf at any desired angle to the fixed leaf of the hinge.

In testimony whereof I have hereunto set my hand in presence of two subscribing witnesses.

HARRISON B. WALTER.

Witnesses:
 G. M. MacDowell,
 Percy L. Platt.